United States Patent Office 3,766,300
Patented Oct. 16, 1973

3,766,300
PROCESS FOR HYDROGENATION OF POLAR COPOLYMERS AND COMPLEXED COPOLYMER COMPOSITIONS
Harold E. De La Mare, El Cerrito, Calif., assignor to Shell Oil Company, New York, N.Y.
No Drawing. Filed Apr. 5, 1971, Ser. No. 131,390
Int. Cl. C08f 15/22; C08d 5/00
U.S. Cl. 260—879                                  5 Claims

ABSTRACT OF THE DISCLOSURE

A process is provided for the rapid hydrogenation of copolymers prepared from conjugated dienes and certain copolymerizable polar monomers such as vinyl pyridines, acrylonitriles and alpha olefin oxides which comprises an initial step of forming a complex between at least one Lewis acid and the polar portions of the copolymer and thereafter subjecting the complex to hydrogenation. Novel complexed copolymers and their hydrogenated derivatives also are provided.

BACKGROUND OF THE INVENTION

This invention concerns a process for hydrogenation of copolymers wherein one of the monomers utilized for the copolymerization is a conjugated diene while the other is a monomer copolymerizable therewith and particularly polar monomers including vinyl pyridines, acrylonitriles (including methacrylonitriles) and alpha olefin oxides. More particularly, the invention is especially concerned with a process for the hydrogenation of block copolymers derived from these monomers.

The technology of block copolymers has advanced rapidly in the last few years. Specifically, a class of thermoplastic elastomers has been developed that has structures such as A-B-(B-A)$_n$ wherein $n$ is zero or a small integer. U.S. Patent 3,231,635 discloses a process for preparing block polymers having A-B-A structure. In these block copolymers the A or plastic type blocks are generally mono alpha alkenyl polymers blocks typified by polystyrene, while the B blocks are elastomeric polymer blocks of a conjugated diene or hydrogenated derivatives of these types of blocks. The polymers are thermoplastic, and are elastomeric if the elastomeric polymer blocks constitute more than about 40% of the total weight of the molecules.

These hydrocarbon block copolymers have been hydrogenated using nickel catalysts to reduce their sensitivity to environmental factors such as heat, ultraviolet light and oxygen. Such three block copolymers prepared from conjugated dienes and mono alpha alkenyl arenes, then hydrogenated, are described in U.S. Patent 3,333,024.

Multiblock copolymers that have vinyl pyridine blocks and diene blocks have been mentioned in the prior art when describing other potential block copolymers or polymerization processes. U.S. Patent 3,108,994 mentions these kinds of polymers. Descriptions of the properties of such polymers or of even the number of polymer blocks in such polymers have often been meagre, and specific applications have not been revealed.

The hydrogenation of copolymers and particularly block copolymers of dienes and alkenyl arenes may be carried out with a number of different types of catalysts but especially when block polymers are concerned it is essential to avoid, insofar as possible, their tendency to degrade under hydrogenation conditions. The art as referred to hereinabove and hereinafter has found that certain classes of hydrogenation catalyst are capable of selective, complete or partial hydrogenation of block copolymers and other copolymers of entirely hydrocarbon character at reasonably rapid rates and under relatively mild conditions while at the same time avoiding appreciable degradation. The two favored classes of such catalysts comprise the reaction products of aluminum alkyl compounds with nickel or cobalt carboxylates or alkoxides. These will be referred to further hereinafter.

Difficulties were encountered as soon as these catalysts were employed for the hydrogenation or attempted hydrogenation of the copolymers with which the present invention is concerned, namely, copolymers of either random or block types wherein one of the copolymerizing monomers is a polar monomer as more fully referred to hereinafter. While the present invention does not rely upon any particular theory, it has been tentatively postulated that the reason for the inadequacy of hydrogenation as just described when treating polar containing copolymers is that the latter are absorbed upon the active sites of the catalyst and prevent its performing its catalytic function thereafter.

OBJECTS OF THE INVENTION

It is an object of this invention to provide an improved process for the hydrogenation of copolymers. It is a particular object of the invention to provide an improved hydrogenation process for copolymers comprising conjugated diene portions and certain copolymerizable polar portions. It is a special object of the invention to provide a process for the rapid hydrogenation of block copolymers having the above description. Other objects will become apparent during the following detailed description of the invention.

STATEMENT OF THE INVENTION

Now, in accordance with this invention, an improved process for the hydrogenation of copolymers of conjugated dienes and copolymerizable polar monomers of the group consisting of alkenyl pyridines, acrylonitriles and alpha olefin oxides is provided which comprises first complexing the copolymers with 0.5–5 moles of a Lewis acid per mole of polar monomer unit and thereafter subjecting the resulting complex to hydrogenation. Still in accordance with this invention, it has been found that optimum results are obtained if the Lewis acid participating in the complex formation is present therein in an optimum amount of 0.9–1.5 moles and still better results are obtained if the hydrogenation temperature is maintained below about a maximum of 65° C. Specifically, the process of the present invention is especially directed, but not exclusively so, to the selective hydrogenation of block copolymers having the above described copolymerizable monomers forming the major part of the copolymer.

Still in accordance with the present invention, novel complexes are provided comprising the complex of a Lewis acid with the polar copolymers to be described further hereinafter. Again in accordance with this invention, hydrogenated complexes are provided which constitute products obtained by hydrogenation of the Lewis acid copolymer complex. Boron trifluoride has been found to be the preferred Lewis acid for utilization in this invention.

The precursor polymers of the present invention are prepared preferably by an ionic or free radical polymerization using an organolithium initiator or Ziegler-type catalyst; they are then complexed with a Lewis acid and selectively hydrogenated. The diene comonomer is at least one conjugated diene having 4 to 8 carbon atoms per molecule, preferably 4 to 6 carbon atoms per molecule. Mixtures of dienes are also contemplated, as well as mixtures of conjugated dienes with relatively minor amounts of mono alpha alkenyl arenes, such as styrene or alpha methyl styrene. Typical conjugated dienes that may be used are butadiene, alkyl substituted butadienes such as isoprene or 2,3-dimethylbutadiene, piperylene and the like. Diene monomers having the α,ω-butadiene structure are preferred.

The alkenylpyridines used in preparing the copolymers have the following general formula:

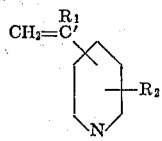

where $R_1$ is an alkyl group or hydrogen and $R_2$ is a ring substituent selected from the group alkyl, aryl, fused aryl, aralkyl, alkaryl, cycloalkyl, alkoxy, aryloxy or dialkylamino. The alkenyl groups preferably are located on the ring carbon atom immediately adjacent to the nitrogen atom in the pyridine ring or on the ring carbon atom 3 carbon atoms removed from the pyridine nitrogen atom.

The term "alkenyl" is to be construed to include the term vinyl for purposes of describing monomers suitable for the present invention. For example, 2-vinylpyridine is to be considered to be a 2-alkenylpyridine, and a vinyl pyridine with a methyl substituent on the alpha carbon atom of the vinyl group may be named 2-isopropenyl-pyridine.

Typical alkenylpyridine monomers suitable for the practice of this invention are 2-vinylpyridine, 2-methyl-4-vinylpyridine, 2-methyl - 5 - vinylpyridine, 3,5-diethyl-4-vinylpyridine, 5-cyclohexyl-2-vinylpyridine, 4-phenyl-2-vinylpyridine, 4-phenoxy-2-vinylpyridine, 6-methoxy-2-vinylpyridine, 4-dimethylamino-2-vinylpyridine.

Suitable copolymers for subsequent complexing and hydrogenation also may be prepared by copolymerization of conjugated dienes with acrylonitriles including not only acrylonitrile itself but also alkacrylonitrile, especially methacrylonitrile. Furthermore, the process of the present invention likewise applies to copolymers formed by copolymerization of conjugated dienes with alpha olefin oxides such as ethylene oxide or propylene oxide as well as mixtures thereof.

It will be understood furthermore that copolymers having more than two copolymerizable monomers may be formed as precursors to the complexing and hydrogenation process. Furthermore, it will be understood that the formation of the precursor copolymers does not form a part of the present invention. Also, it will be understood that the complexing and later hydrogenation of these copolymers applies not only to random copolymers but also to branched copolymers, linear copolymers, block copolymers and tapered copolymers.

Block copolymers are a special concern of the present invention. These may have two or more polymer blocks, at least one of which is a conjugated diene polymer block and another of which at least predominates in one or more of the above discussed polar monomer units. Preferably, the block copolymers have structures such as the following A—B—(B—A)$_{0-1}$, A—(B—A)$_{2-5}$ and
A—B—(B—A)$_{2-5}$ However, it is emphasized that the precise structure of the copolymers with which this invention is concerned is not critical to the successful operation of the process. Suitable block copolymers especially contemplated for use therein are the following:

polybutadiene-poly(2-vinylpyridine)
polyisoprene-poly(2-vinylpyridine)
polybutadiene-poly(ethylene oxide)
polyisoprene-poly(propylene oxide)
polybutadiene-poly(acrylonitrile)
polyisoprene-poly(methacrylonitrile)
poly(2-vinylpyridine)-polybutadiene-poly(2-vinylpyridine)
poly(methacrylonitrile)-polyisoprene-poly(2-vinylpyridine)

The average molecular weight of the diene polymer block in the block polymer before hydrogenation may be from 3,000 to about 100,000, preferably from about 5,000 to about 70,000. The alkenylpyridine (or other polar) polymer blocks may have average molecular weights from about 50 to about 75,000, preferably from about 1,000 to about 40,000. The proportion of polar polymer blocks may be from about 5% by weight to about 90% by weight of the total weight of the block polymer, depending on the intended use of the polymer after hydrogenation. After hydrogenation and at moderate to high molecular weights, the properties of the block copolymer will range from highly elastomeric products at low polar block percentages to slow-recovering elastomers or even products of near-plastic character at high polar polymer block content. The tensile strength will be relatively low at all molecular weights. When the total molecular weight of the block copolymer is relatively low, for example, 1,000 to 5,000, the products may not have pronounced elastomeric or plastic character, but still be useful as compatibilizers or polydispersants, for example, because of the marked difference in polarity of the two kinds of blocks.

Solution (anionic) polymerization by techniques known to the art is preferred to make the block copolymer, using monofunctional lithium based catalysts, for example, lithium alkyls. However, free radical polymerization also is contemplated for preparation of the precursor polymers. In the known anionic solution polymerization process, the diene monomer is dissolved in an inert solvent and polymerized under anaerobic conditions using highly purified monomers and solvents scavenged such as with a lithium alkyl. The diene polymer block is prepared first by adding sufficient lithium alkyl to an inert hydrocarbon solution of prepurified and scavenged conjugated diene to cause polymerization to a polymer block of appropriate molecular weight. After the diene has been consumed by polymerization, or any excess is removed, the prepurified and scavenged alkenyl pyridine or other polar monomer(s) is introduced to the reaction vessel and polymerization is continued to form the polar block of the desired molecular weight.

Using methods described in the prior art, such as in U.S. Pat. 3,301,840, control may be exercised, if desired, over the microstructure of the diene polymer block by adding a polar substance before or during polymerizing the diene. If a polar substance is not added, the microstructure of the diene molecule introduced into the growing chain will ordinarily be mostly in the cis 1,4 and trans 1,4 configuration. If polar substances, such as ethers, thioethers or tertiary amines, typified by tetrahydrofurane or particular tetramethylethylene diamine, are added in amounts from 0.5 to 50 moles per mole of lithium ion, increasing percentages of 1,2 and/or 3,4-microstructure (depending on the diene) and decreasing percentages of 1,4-microstructure can be installed in the growing chains. Perceentages as high as 90% 1,2 can be obtained when selected amounts of polar substances are present.

Control of the microstructure of the diene polymer block may at times be important to the properties of the hydrogenated product. When the diene polymer block is hydrogenated, the polymer block produced is essentially a polyethylene with various alkyl substituents. If alkyl substitution is low or negligible, as in a hydrogenated polybutadiene block or low 1,2 microstructure, segments of the block may crystallize, contributing plastic character to the final block copolymer. Ethyl or isopropyl side chains produced from 1,2 or 3,4 microstructure of the diene polymer block by hydrogenation will prevent crystallization and thus promote elasticity; but when present in large numbers such groups interfere with local segment motion of the backbone chain and decrease the elastomeric character of the final block copolymer. Regularly spaced methyl side chains, as in the polyisoprene, interfere with crystallinity, but do not reduce elastomeric quality when the polymer is hydrogenated. However, additional larger size alkyl groups produced from high 3,4 microstructure in a polyisoprene block will lower elastomeric quality. The proper concentration of these alkyl side chains can only be determined by experiment, and by trial of finished two-block products in a particular end use.

As stated hereinbefore, attempts to selectively hydrogenate the polar copolymers described above have resulted in little, if any, hydrogenation thereof. While the hydrogenation may be attempted over the entire molecule, it is especially contemplated in the process of this invention to selectively hydrogenate such copolymers so that the diene double bonds are largely reduced while the double bonds of the polar portions of the copolymer are little, if at all, affected.

The precursor block copolymer is selectively hydrogenated under conditions chosen so that at least about 80% of the aliphatic olefinic double bonds will be saturated. Conditions may be regulated to saturate substantially all of the olefinic double bonds without saturating more than a token quantity of the double bonds in the pyridine rings, or conditions can be chosen so that no more than about 25% of the aromatic double bonds in the alkenylpyridine polymer block are hydrogenated. This selectivity is achieved by choice of catalysts and the rate of hydrogenation is sharply accelerated by the presence of an unusual polar additive, that is, a compound that is a Lewis acid that will complex with the nitrogen atoms of the pyridine nuclei during hydrogenation.

Lewis acids are generally defined as substances that can accept an electron pair to form a covalent bond, i.e. they are electron pair receptors. They may be added in unmodified form or as their etherates in certain cases, e.g., boron halide etherates.

The following list illustrates suitable Lewis acids to be used in the process of this invention.

| | Lewis acids | |
|---|---|---|
| I | $BF_3$ | $BF_2OR$ |
| | $BF_xCl_{3-x}$ | $BCl_2OR$ |
| | $BCl_3$ | |
| | $BCl_xBr_{3-x}$ | |
| | $BBr_3$ | |
| II | $AlEtCl_2$ | $Al(OR)_3$ R=$CH_3$, Et, i-Pr |
| | $AlMeCl_2$ | |
| | $AlR_{1.5}Cl_{1.5}$ | |
| | $AlR_2Br$ and $AlR_{1.5}Br_{1.5}$ | |
| | $AlEtClBr$ | $AlBr_3$ |
| III | Zn Me Cl | |
| | Zn Et Cl | |
| | Zn R Cl | |
| IV | Ga $Cl_3$ | |
| | Ga $Cl_x Br_{3-x}$ | |
| | Ga $F_3$ | |
| | Ga $RX_2$ | |

Catalytic hydrogenation of these precursor polar copolymers is difficult and extremely slow when no complexing agent is present. Presumably the polar radicals in the copolymer occupy many of the active sites on the catalyst and hinder its activity. Addition of a strong complexing agent for the polar radical is believed to prevent its inactivating the catalyst. For example, catalysts formed from nickel salts reduced with aluminum triethyl must be added in several increments during hydrogenation of a diene-alkenylpyridine block copolymer and even then hydrogenation of the diene block will not be complete because of catalyst "dieout."

Complexing occurs with Lewis acids, typified by boron trifluoride, present in amounts from 0.5 to 5.0 moles, preferably 1 to 3 moles per mole of pyridine nitrogen atoms in the alkenylpyridine block. Hydrogenation then proceeds smoothly, rapidly and selectively to produce partial or complete hydrogenation of the diene polymer blocks and from zero to as much as about 25% hydrogenation of the polar comonomer units, depending on conditions. Other aspects related to the process of this invention are disclosed and claimed in a copending application, Ser. No. 131,391, filed Apr. 5, 1971.

Inert aliphatic or cycloaliphatic solvents are preferred as hydrogenation solvents. Mixtures of solvents may be employed, such as an isooctane/cyclohexane solution containing 5%/w. to 15%/w. polymer. The reaction product from polymerization may be hydrogenated directly without intervening isolation of the unsaturated block copolymer, or the unsaturated block copolymer may be isolated and stored until needed. Aromatic solvents may be used if necessary but in general appear to be less useful and may interfere with the complexing role of the Lewis acid.

The Lewis acid may be added prior to or after the catalyst injection. The polymer to catalyst weight ratio may be from about 3,000:1 to about 100:1, preferably from 1,000:1 to about 250:1, using reduced nickel or cobalt or other transition metal catalyst, depending on the activity of the catalyst and the extent of hydrogenation desired.

The hydrogenation catalyst preferably is prepared from a transition metal salt or alkoxide, such as the metal acetate, propionate, butyrate, or hexoate, octoate, or decanoate of nickel or cobalt, reduced with an aluminum trialkyl or triaryl, such as aluminum triethyl, aluminum triisobutyl, or aluminum triphenyl using for example an aluminum trialkyl or triaryl to metal salt or alkoxide molar ratio of about 2.5 to 1. The transition metal catalyst may also be prepared by other reduction reactions known to the art; for example, by reduction with hydrogen. Raney nickel and nickel on kieselguhr are well-known catalysts that are suitable in some cases. During hydrogenation the temperature may be from 25° C. to about 200° C., but is preferably 40° C. to 170° C. depending on the extent of hydrogenation desired and which metal catalyst is chosen. Hydrogen pressures may be 500 p.s.i.g., but are preferably 700 p.s.i.g. to 1500, and the reaction time may be 0.1 to 10 hours, but is preferably 0.5 to 7 hours. The hydrogenated product complexed with Lewis acid may be recovered by methanol coagulation, for example, and may be used for certain purposes described below, or it may be treated with excess ammonia or an aliphatic amine to break the complex before recovery by coagulation. When hyrogenating in the presence of Lewis acid, the temperature is preferably 25–70° C.

By choosing reaction conditions and particular catalysts the extent of hydrogenation may be selectively controlled. With a cobalt catalyst and hydrogenation at about 170° C., for example, only 65–70% of the diene polymer block is hydrogenated. Hydrogenation at about 40° C. with a nickel catalyst saturates almost 100% of the diene polymer block but essentially none of the polar monomer units. When hydrogenation was conducted at about 170° C. with a nickel catalyst about 80% of the diene polymer block and a substantial percentage of the alkenylpyridine polymer block is saturated.

The extent of hydrogenation may be determined by techniques described in the prior art, such as by determination of the iodine number by the well known method used for fats. The 1,2 and 1,4 and 3,4 microstructure in the diene polymer block before and after hydrogenation may also be measured using a nuclear magnetic resonance spectrometer or an infrared spectrometer. Hydrogenation of the pyridine rings in the alkenyl pyridine polymer block may be detected by the disappearance of weakly basic nitrogen atoms and the appearance of stronger basic nitrogen atoms (e.g. piperidine-type) in potentiometric titration with hydrogen chloride in non-aqueous media.

The selectively hydrogenated polymers are useful for many purposes where a certain amount of polarity is desired and stability with respect to oxygen or ozone are also required. The complexes also have separate utilities and can be blended with other polymers or used without modification either before or after complex formation, for such purposes as providing dispersant activity in hydrocarbon solevnts, in the desalting of brackish or salty waters or in the formation of thermoplastic or elastomeric art effects.

EXAMPLE I

A butadiene-2-vinylpyridine two-block copolymer was prepared by techniques known to the art. Typical methods are described in U.S. Pat. 3,231,635. Using anaerobic conditions 576 g. of purified toluene that had been scavenged with sec-butyl lithium, ~100 g. of purified butadiene, 4.2 ml. of anhydrous diethyl ether, and 2.0 millimoles of sec. butyl lithium were injected at 30° C. Polymerization occurred and was continued for 2½ hours to consume the butadiene and form living polybutadienyl lithium molecules. A 50 g. sample was withdrawn for analysis. Then 8.7 g. of purified and scavenged 2-vinylpyridine was added. Polymerization was continued at −20 to −34° C. until the second monomer was consumed. A final sample was removed.

The living polymer was killed with methanol and the two-block copolymer was recovered by coagulation in methanol. Analysis of the two samples by a tritium method and by nitrogen analysis (Kjeldahl) indicated that the number average molecular weights of the polymer blocks were 64,600 and 5,000, respectively, for the polybutadiene and poly(2-vinylpyridine) blocks.

EXAMPLE II

The butadiene-2-vinylpyridine two-block copolymer of Example I was complexed with boron trifluoride and hydrogenated in solution using a reduced nickel catalyst. In this precursor polymer the butadiene polymer block had 85% 1,2 microstructure.

A 5.2%/w. solution of the copolymer in isooctane/cyclohexane mixture was treated with boron trifluoride-etherate to provide a 1:1 molar ratio of boron trifluoride to the nitrogen content of the 2-vinylpyridine polymer block. A portion of this solution was coagulated with methanol to recover a solid, thermoplastic complexed unsaturated polymer. A nickel dioctoate catalyst reduced with 2.5 times its molar quantity of aluminum triethyl at 25° C. was added to the polymer soltuion; the nickel to polymer ratio was 1:500 by weight. Hydrogen was introduced to 1200 p.s.i.g. and the temperature was maintained at 40–50° C. during hydrogenation. After one hour 90% of the 1,2-microstructure in the polybutadiene block was saturated, and after 3 hours about 100% of the 1,2 polybutadiene microstructure and at least 90% of the trans 1,4 microstructure were hydrogenated. The 2-vinylpyridine block was not significantly hydrogenated, as shown by infrared analyses.

The product was a hydrogenated block copolymer-boron trifluoride complex, part of which was coagulated with methanol and dried in vacuo to obtain a solid, thermoplastic polymer. The major portion of the product was treated with ammonium hydroxide to release the boron trifluoride, then the non-complexed polymer was recovered by coagulation with methanol and drying in vacuo.

EXAMPLE III

Example II was repeated in the absence of any Lewis acid at a hydrogenation temperature of 170° C. with the other conditions held essentially the same. After 3 hours only 78% of the 1,2 polybutadiene microstructure in the block copolymer had been hydrogenated. Potentiometric titration of the hydrogenated product with hydrogen chloride in 30/70 isopropanol/toluene solution indicated the presence of 0.007 equivalents per 100 g. of strong base and 0.023 equivalent per 100 g. of weak base in the hydrogenated block copolymer. The strong base reflects the hydrogenation of 23% of the pyridine rings to piperidine rings,

EXAMPLE IV

The same polymer described in Example II was hydrogenated with a reduced cobalt catalyst [from Co (2-ethyl hexanoate)$_2$ and Al(Et)$_3$, 1:2.5 molar ratio] at 170° C., with other conditions essentially the same. After one hour only 68% of the 1,2 polybutadiene microstructure in the polymer was saturated with hydrogen; no further change was observed at 3 hours.

EXAMPLE V

A two-block copolymer of isoprene and 2-vinylpyridine was hydrogenated in the same way as in Example II. The block copolymer had a polyisoprene block of 50,000 number average molecular weight (93% 1,4 7% 3,4) and a 2-vinylpyridine polymer block of 5,500 number average molecular weight and was made in a 12%/w. heptane/cyclohexane (85/15) solution, to which was added 1 g. of reduced nickel per 500 g. of polymer. Sufficient boron trifluoride-etherate was introduced to provide 1 mole per mole of pyridine nuclei in the 2-vinylpyridine polymer block. Hydrogen was introduced at 1200 p.s.i.g. After 5 hours at 40–45° C., 100% of the 1,4 microstructure and 91% of the 3,4 polyisoprene microstructure had disappeared, whereas essentially none of the pyridine nuclei had been hydrogenated. The product was characterized by infrared and NMR analysis, and by gel permeation chromatography. The product could be isolated as principally the BF$_3$—complexed material or as the non-complexed polymer by following the procedure of Example II.

EXAMPLE VI

The conditions described in Example II were reproduced, utilizing ethyl aluminum dichloride as the Lewis acid in an equimolar ratio of the dichloride to vinylpyridine units. About 95% reduction of 1,2 unsaturation was effected and about 65% of trans 1,4 reduction was effected along with substantially all of the cis 1,4 at the end of two hours.

EXAMPLE VII

In the manner of Example I, living polybutadienyl lithium (Mn~55,000 by tritium analysis) was prepared in toluene in the presence of tetrahydrofuran (50:1, molar ratio of THF:RLi) at 0–5° C. The living polymer was capped with diphenylethylene and the reaction mixture coated to −55° C. where methacrylonitrile (6.83 g.) was added to 1.36 mmoles of the living anionic polymer. After about 2 hours at −50°±5° C., the reaction was terminated by adding a tetrahydrofuran solution (20 mls. THF, 0.5 ml. of 10%/w. HCl in isopropyl alcohol). The reaction mixture brought to room temperature and coagulated in acetone-methanol (~50/50, v./v.), and dried in vacuo. The isooctane-soluble polymer (~85 to 90% of the total) was taken for further hydrogenation studies. The polymer was also characterized by GPC (gel permeation chromatography) analysis, which showed ~23% "coupled" product and by N analysis (Kjeldahl) for the methacrylonitrile content (~1.5%/w.). The linear two-block polymer had a segmental composition of ~55,000–1,000.

The block copolymer of butadiene and methacrylonitrile was subjected to hydrogenation under the conditions given in Example II above using a temperature of about 40–60° C. At the end of about 3 hours, the reduction of 1,2 butadiene was about 62% and of trans 1,4 butadiene was about 33% when no Lewis acid was present. When hydrogenation was preceded by complex formation with boron trifluoride in an equimolar amount of BF$_3$ to nitrile units, substantially complete hydrogenation of the aliphatic double bonds occurred in the same time.

I claim as my invention:

1. A process for the selective hydrogenation of lithium alkyl-initiated copolymers of conjugated dienes and co-polymerizable polar monomers of the group consisting of alkenyl pyridines, acrylonitriles, and alpha olefin oxides which comprises:

(a) complexing the copolymer in solution with a 0.5–5 moles of a Lewis acid per mole of polar monomer unit, said acid being selected from the group consisting of boron halides and etherates of the same; and (b) hydrogenating the copolymer complex, utilizing as the sole hydrogenation catalyst the reaction product of nickel or cobalt fatty acid salts and aluminum trialkyls, until at least about 80% of all olefinic double bonds are reduced and no more than 25% or any aromatic double bonds are reduced.

2. A process according to claim 1 wherein the copolymer is a block copolymer.

3. A process according to claim 2 wherein the block copolymer is a copolymer of at least one conjugated diene and at least one alkenyl pyridine.

4. A process according to claim 2 wherein the Lewis acid is $BF_3$.

5. A process according to claim 1 wherein subsequent to hydrogenation, the complex is broken by treatment with an agent of the group consisting of ammonia and amines.

References Cited

UNITED STATES PATENTS

| | | | |
|---|---|---|---|
| 3,525,729 | 8/1970 | Gaeth | 260—94.3 |
| 3,600,464 | 8/1971 | Bauer | 260—879 |

FOREIGN PATENTS

| | | | |
|---|---|---|---|
| 992,210 | 5/1965 | Great Britain | 260—94.7 |

OTHER REFERENCES

Organic Chemistry, 3rd ed., Fieser & Fieser, Reinhold Pub. Corp., 1956, pp. 138, 226.

JOSEPH L. SCHOFER, Primary Examiner

W. F. HAMROCK, Assistant Examiner

U.S. Cl. X.R.

260—82.1, 83.3, 88.3 R, 94.7 H, 96 H, 23.7 R, N